United States Patent [19]

Stupf et al.

[11] 3,716,970
[45] Feb. 20, 1973

[54] FILTER DEVICE AND METHOD FOR THE MANUFACTURE THEREOF

[75] Inventors: Ewald Stupf, Birmensdorf; Tammo Haan, Dietlikon, both of Switzerland

[73] Assignee: Luwa AG, Zurich, Switzerland

[22] Filed: Aug. 13, 1970

[21] Appl. No.: 63,519

[30] Foreign Application Priority Data

Aug. 20, 1969 Switzerland..........................12591/69

[52] U.S. Cl. ...................... 55/521, 55/500, 156/178, 161/47
[51] Int. Cl. ............................................B01d 39/20
[58] Field of Search .........55/521, 497, 500; 161/47; 156/178, 203, 205

[56] References Cited

UNITED STATES PATENTS

| | | | |
|---|---|---|---|
| 2,915,426 | 1/1959 | Poelman | 55/521 X |
| 1,812,963 | 7/1931 | Kvet | 156/178 X |
| 3,575,769 | 4/1971 | Radzio | 156/203 X |
| 2,140,213 | 12/1938 | Tegarty | 156/203 |

Primary Examiner—Arthur D. Kellogg
Attorney—Werner W. Kleeman

[57] ABSTRACT

A filter device comprising zig-zag folded substantially flat filter material is disclosed. The invention contemplates the provision of at least one, but preferably a plurality of substantially parallel tubular-shaped elements defining bead means or elevated portions secured to a least one side of the filter material. The tubular-shaped elements extend substantially perpendicular to the folds of the filter material and serve to support such folds in spaced relationship from one another.

The invention further contemplates an improved method for the manufacture of such filter device wherein prior to the formation of the folds at the flat filter material there is first formed at least one tubular-shaped element at the filter material, then an adhesive material is applied to the tubular-shaped element, preferably by introduction thereof internally of such tubular-shaped element so that the adhesive material penetrates through the tubular-shaped element and fixedly adheres such tubular-shaped element to the neighboring portions of the filter material.

17 Claims, 5 Drawing Figures

PATENTED FEB 20 1973 3,716,970

INVENTORS
EWALD Stupf &
TAMMO HAAN

BY *Donald P. Cheema*

ATTORNEY

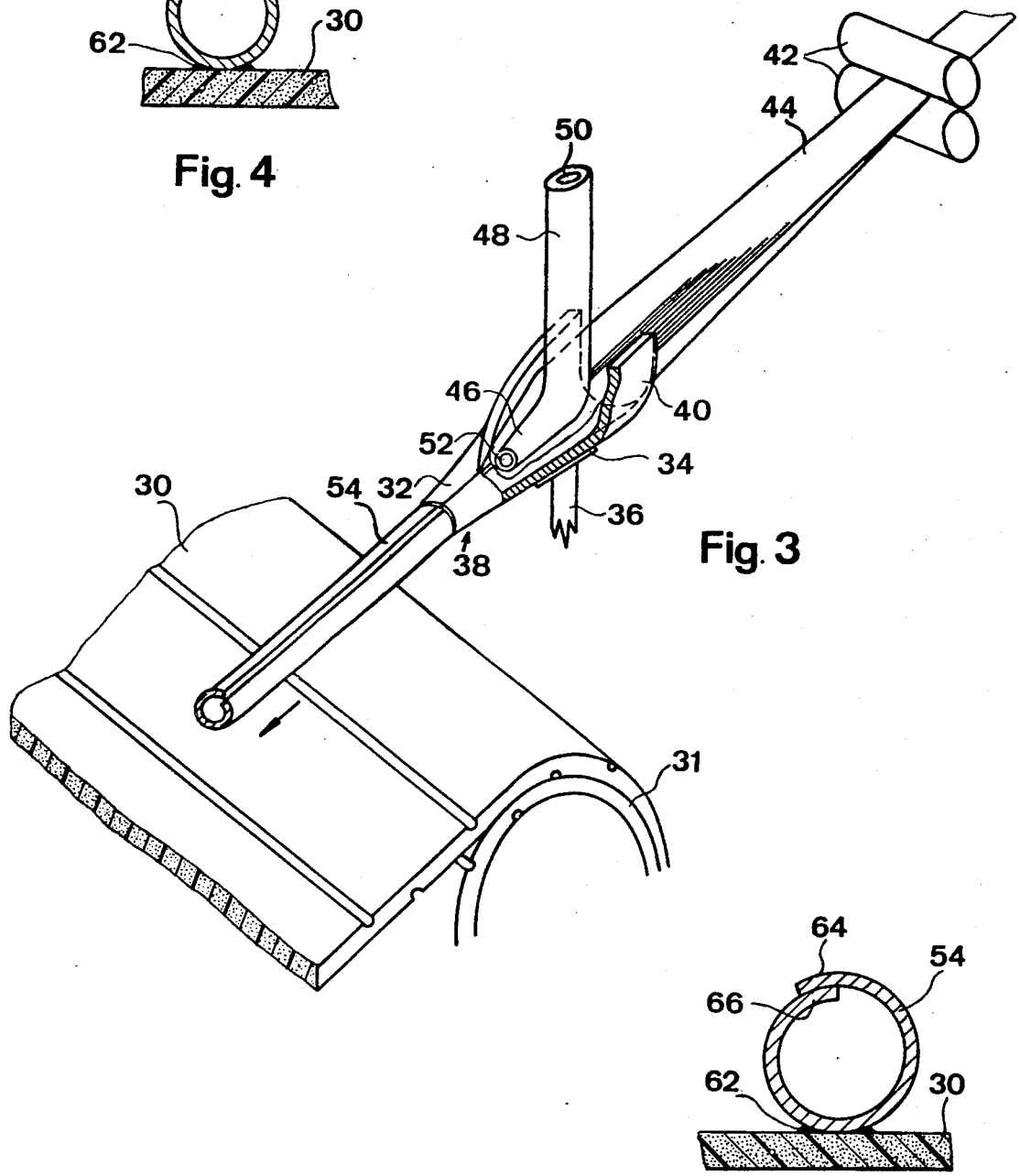

FILTER DEVICE AND METHOD FOR THE MANUFACTURE THEREOF

BACKGROUND OF THE INVENTION

The present invention relates to an improved filter device of the type formed of substantially zig-zag shaped, folded, flat filter material, and further pertains to a new an improved method for the manufacture of the aforesaid filter device.

Filter devices of this general type are already known to the art, wherein for the purpose of increasing the effective filtration surface the filter material is folded, the folds being oriented at a predetermined angle with respect to the direction of gas flow. Now, in order to prevent the individual folds from bearing against one another, for instance as might occur due to unsatisfactory mounting in a filter frame, thus rendering ineffectual a portion of the filter material for the throughflow of the gas, it has already been proposed to adhesively bond to the filter surfaces a plurality of parallelly extending spaced textile strips. When the filter material is folded these textile strips contact one another, so that there is provided the required spacing of the individual folds from one another to permit the throughpassage of the gas.

However, drawback which exists when using textile strips as the spacer means for the folds of the filter material resides in the fact that the spacing between the folds provided by the textile strips can only be chosen to be relatively small. Reason for this is that if the textile strips are too thick, then, they can no longer be accommodated to the internal radius of curvature of the folds. Due to this inaccessibility defects can occur in the filter material, typically for instance leaks in the filter material, so that the entire filter device has to be considered unusable and discarded.

SUMMARY OF THE INVENTION

Accordingly, there is a real need in the filtration art for an improved filter device which is not associated with the aforementioned drawbacks of the prior art constructions. Accordingly, a primary objective of this invention is the provision of a filter device which is not associated with the aforementioned drawbacks of the prior art constructions and which effectively fulfils this need.

Another noteworthy object of the present invention relates to an improved method for the fabrication of the inventive filter device.

Still a further significant objective of this invention resides in the provision of a novel spacer means for maintaining the requisite spacing between the folds of the filter material and which avoids the drawbacks associated with the heretofore employed band-like spacers.

Yet a further significant object of the present invention relates to an improved technique for the fabrication of folded filter material equipped with fold-spacer means ensuring for the proper spaced relationship of the folds from one another, to avoid impairment of the throughflow of the fluid medium undergoing the filtration process, and wherein the manufacturing technique is readily suitable for mass-production applications, with increased economy and efficiency during production.

Now, in order to implement these and still further objects of the invention, which will become more readily apparent as the description proceeds, the inventive filter device formed of zig-zag shaped, folded, substantially flat, filter material is equipped with raised portions or bead means for maintaining the folds in spaced relationship from one another. The bead means are arranged and secured to at least one side of the filter material and extend parallel to one another and essentially perpendicular to the folds of the filter material. According to an important aspect of the invention, such bead means consist of substantially tubular-shaped elements.

A further significant aspect of the present invention is the provision of an improved method for the production of the inventive filter device wherein the flat filter material, prior to the formation of the folds thereof, is equipped at least at one filter surface of the filter material with at least one bead means provided with an adhesive for attachment of such bead means to the filter material. In its more specific aspects, the inventive method is manifested by the features that each tubular-shaped element defining the bead means is formed directly prior to its attachment with the filter material, and flowable adhesive material is introduced internally of each tubular-shaped element in such a manner that the adhesive penetrates through the sleeve or outer wall of the relevant tubular-shaped element and thus fixedly bonds each such tubular-shaped element to the neighboring portions of the filter material.

The use of the inventive tubular-shaped, deformable sleeve member or casing as the spacer means for the folds of the filter device affords the advantage that for the formation of the folds there can be selected a relatively small fold or bend arc since the sleeve member when compressed together provides the advantages of a textile band or strip. Furthermore, the use of the tubular-shaped sleeve members as spacer means simultaneously provides the advantage of being able to select larger fold openings since the cross-section of the tubular-shaped elements tends to fill a larger cross-section than a textile band. Such becomes particularly significant during the fabrication of filters possessing large height of the folds.

Additionally, when using the inventive tubular-shaped sleeve members or casings, it is possible to fabricate a filter device which in cross-section possesses substantially V-shaped zig-zag folds, wherein each fold opening at the root of a fold, at a minimum, can correspond to twice the wall thickness of the sleeve member since the internal walls may be brought into contact with each other. Furthermore, during folding of the filter, a pressure can be applied to the sleeve members, for sufficiently tight folds resulting in a flattening of such sleeve members or bringing the internal spaced walls into contact. These flattened sleeve members insure for an improved contact or bearing of the oppositely situated bead portions within the same fold.

Additionally, the use of tubular-shaped sleeve members as spacer means, contemplated by the present invention, the deformability of which also permits an axial elongation, affords the further advantage that during the formation of a fold the portions of the sleeve member subjected to the greatest tensional stress at the region of the outermost fold arc are protected in that the sleeve members are pressed flat over the fold arcs. By preventing the appearance of large load peaks at the spacer means there is considerably prevented the danger of damaging the filter material.

When utilizing the filter device which has been produced according to the preferred method of the invention, an additional advantage is realized in that the quantity of internally injected adhesive material necessary for attaching the spacer means to the filter material as well as for securing them in fixed relationship to one another, can be maintained at an absolute minimum. Thus, the effective filter surfaces are not clogged by any excess of adhesive.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a schematic view of a preferred embodiment of apparatus used in the manufacture of the inventive filter devices according to the method aspects of the present invention;

FIG. 4 is an enlarged cross-sectional view through a portion of the filter fold-spacer means of the invention; and FIG. 5 is a further enlarged cross-sectional view through a modified form of filter fold-spacer means of the invention.

DETAILED DESCRIPTION OF THE PREFERRED EMBOdIMENTS

Figure 1:
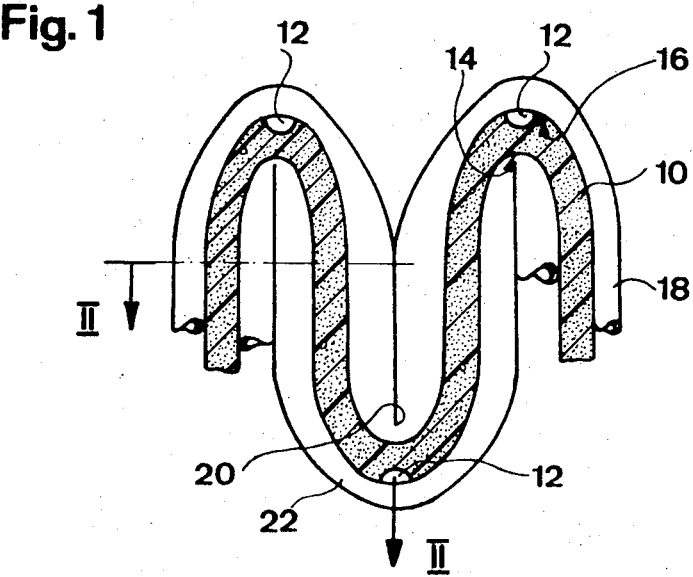
FIG. 1 is a fragmentary cross-sectional view of a filter fold of a filter device of the invention.

Describing now the drawings, FIG. 1 illustrates in cross-section a filter fold provided at a filter mat 10, such filter fold incorporating an inner curved fold portion 14 as well as an outer curved fold portion 16. In accordance with the alternate position of the outer fold portion 16, with respect to the surfaces of the filter mat 10, such outer fold portion 16 is equipped, in known manner, with the respective fold regions 12 facilitating folding of the filter mat 10 into a zig-zag shaped configuration. Substantially tubular-shaped deformable sleeve members or casings 18, defining raised portions or bead means, are attached to the filter surfaces approximately perpendicular to the folds and parallel to one another, prior to folding of the filter mat 10. Now for the purpose of attaching the sleeve members 18 such are drawn, in known manner, through a suitable adhesive material and thereafter placed upon the filter surface, the adhesive material functioning as an attachment means between the sleeve member 18 and the filter mat 10. It would, of course, also be possible to coat each tubular-shaped sleeve member 18 with a suitable adhesive material for attachment purposes. The sleeve members may be formed of a suitable commercially available deformable plastic, from textile fibers or an appropriate porous material. Furthermore, as explained in greater detail hereinafter, it is possible to introduce the adhesive material which can solidify into the tubular-shaped sleeve member, which then diffuses through the wall of the sleeve member and into contact with the surface of the filter mat to thereby attach such sleeve member to the filter mat in this manner.

After attachment of the sleeve members 18, serving as the spacer means, to the filter mat 10, the filter mat 10 is folded at the fold locations 12 into a substantially zig-zag shaped filter configuration. Through the use of tubular-shaped deformable sleeve members 18 as the spacer means it is now possible to maintain very small the radius determining the inner fold arc 14; that is to say, this radius, at a minimum, amounts to twice the wall thickness of the corresponding sleeve member 18. If there is provided a small folding radius, then, the sleeve member 18 is deformed into a kink or bend location 20 at which the tubular-shaped material of the sleeve member 18 linearly elongates along the fold. Due to the deformability of the sleeve members 18 such can readily accommodate themselves to the most different type of fold configurations directly at the regions neighboring the kink locations 20.

Hence, the sleeve members 18 can extend with a constant or increasing diameter towards the outer fold arcs 16. However, it is of importance that the spacing of the folds of the filter mat 10 is smaller than twice the diameter of the sleeve members 18, so that over a certain height of the folds there is attained a flattening of the sleeve members 18, as best shown by referring to FIG. 2. As a result, there is achieved a wider contact surface between the sleeve members 18.

Due to the capillary action, the adhesive material is drawn into the region of the contact locations 24 (FIG. 2), so that there is formed an attachment seam between each two connecting sleeve members 18.

Attention is now invited to FIG. 3 illustrating apparatus structure for carrying out a preferred method of manufacturing the inventive filter devices. Reference character 30 designates a rolled filter mat formed of substantially flat filter material which has been pre-folded in accordance with known techniques. A funnel 32 is arranged slightly below the line of flight of the extended or spread filter mat 30 at the direct region of the filter mat roll 31. Funnel 32 is secured to a carrier plate 34 attached to a support or stand 36. This support or stand 36 is mounted, for instance, to a non-illustrated machine frame. The funnel 32 will be understood to embody a substantially tubular-shaped discharge mouth or location 38 arranged parallel to the filter mat 30. On the other hand, the inlet location 40 of the funnel 32 is cut open so that the cut-away portion 40 gradually merges into a substantially U-shaped channel. The lengthwise axis of funnel 32 is arranged essentially perpendicular with respect to the axis of the filter mat roll 31. Now, a nozzle member 46 connected with a support 48 and possessing an outlet or discharge opening 52 is arranged coaxially with respect to the lengthwise axis of the funnel 32 at the cutaway portion 40 thereof. Nozzle support 48 is provided with an opening 50 which communicates with the nozzle discharge opening or outlet 52.

Continuing, it will be observed that the apparatus structure for the performance of the inventive method further embodies a pair of braking roller members 42 disposed at a spacing from the filter mat roll 31 at the side facing away from the funnel 32. The lengthwise axes of the braking roller members 42 extend approximately perpendicular to the lengthwise axis of the funnel 32. A band member 44, ultimately to be formed into the tubular-shaped sleeve or casing defining the bead means for the filter device, is drawn between the rollers 42. This band 44 is guided into the funnel 32 and is progressively formed or rolled by the latter into a tubular-shaped structure. The band 44 leaves the funnel 32 in the form of a tubular-shaped sleeve member or casing 54. The outlet opening 52 of the nozzle 46 is arranged in the funnel member 32 in such a way that it approximately coincides with the location at which the two lengthwise marginal edges of the band 44 join together to form the tubular-shaped sleeve member 54.

During such time as the band member 44 is drawn through the funnel member 32 a suitable adhesive material flows through the opening 50 of the support 48 and the nozzle opening 52 into the tubular-shaped sleeve member 54. Depending upon the quality and characteristics of the adhesive material, such can flow either under its own weight or by being subjected to an additional pressure into the confines of the sleeve member 54. Since the band member 44 is advantageously formed of a pervious or porous material, upon contact with the adhesive material such band is imbued thereby, so that the marginal locations of the band member 44 are adhesively bonded to one another. Furthermore, the adhesive material flowing through the sleeve member 54 additionally serves to attach the sleeve member 54 to the surface of the filter mat 30.

By appropriately designing the outlet location 38 of the funnel 32, it is possible for a predetermined width of the band member 44 to achieve different types of connection locations or joints for the tubular sleeve member 54. For instance, if the width of the band member 44 corresponds to the length of the circumference of the funnel outlet location 38, then, as shown in FIG. 4, there is provided a butt-joint seam 56. However, if the width of the band member 44 is greater than the length of the circumference of the funnel outlet location 38, then, it is possible, as best shown by referring to FIG. 5, to have the marginal portions 64 and 66 of the band member 44 bent into a tubular-shaped sleeve member 54 overlapping one another. This modified form of tubular-shaped sleeve member 54 has the advantage, in contrast to the butt-joint seam 56 of the arrangement of FIG. 4, that there is produced a stronger connection seam at the sleeve member 54.

Naturally, it is also possible to produce with the same band member 44 sleeve members 54 possessing different diameters by appropriately changing the outlet diameter of the funnel outlet location 38.

Figure 2:
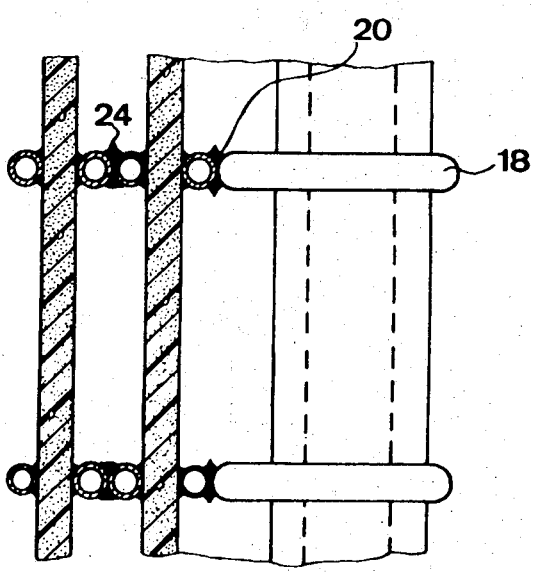
FIG. 2 is a fragmentary cross-sectional view of the filter fold depicted in FIG. 1, taken substantially along the line II—II thereof.

During the zig-zag like folding of the filter mat 10 (FIG. 1) or 30 (FIG. 3), equipped with the respective sleeve members 18 and 54, it is of importance that the individual sleeve members 18 or 54 are pressed against one another so that the sleeve members are flattened, as indicated in FIG. 2.

The described method for the fabrication of the inventive filter device is preferably carried out continuously by utilizing endless filter mats as well as endless sleeve members. In so doing, it is of importance that the adhesive material, which is introduced or otherwise provided during the formation of the sleeve member, and by means of which such sleeve members can be attached to the filter mat, does not solidify or set before the filter mat has been folded. On the other hand, in order to insure that there is positively maintained a uniform, predetermined spacing between the neighboring folds of the filter mat, the previously mentioned compressive or pressing force must be maintained until the adhesive material has solidified.

It is advantageous to select a commercially available adhesive material which considerably improves the rigidity or stiffness of the tubular-shaped sleeve members when it has attained its set or solidified condition.

Furthermore, it should be understood that by utilizing two or more apparatuses of the type shown and described in conjunction with FIG. 3, it would be possible to simultaneously apply to both sides of the filter mat 30 a plurality of sleeve members 54 serving as fold-spacer means. In so doing, care must be taken to insure that the adhesive material introduced into the sleeve members 54 is taken up by such sleeve members and does not flow away through the slotted funnel.

Finally, it is mentioned that the field of use of the inventive filter device is not limited just to the filtration of gaseous media, but also can be employed to advantage for the filtration of liquid media.

While there is shown and described present preferred embodiments of the invention, it is to be distinctly understood that the invention is not limited thereto, but may be otherwise variously embodied and practiced within the scope of the following claims.

Accordingly, what is claimed is:

1. A filter device comprising zig-zag folded substantially flat filter material having a plurality of folds, at least one substantially tubular-shaped element defining bead means secured to at least one side of said filter material, said tubular-shaped element extending substantially perpendicular to said folds and having corresponding alternate internal and external bends at the folds and serving to mutually support said folds in spaced relationship from one another, said tubular shaped element being selectively at least partially collapsed by inward movement of the spaced walls at the bends to allow formation of the desired tightness of folds without damaging the filter material at the bends.

2. A filter device as defined in claim 1, wherein there is provided a plurality of said tubular-shaped elements which extend in substantial parallelism to one another.

3. A filter device as defined in claim 1, wherein said tubular-shaped element is formed of a deformable plastic.

4. A filter device as defined in claim 1, wherein said tubular-shaped element is formed of textile fibers.

5. A filter device as defined in claim 1, wherein said tubular-shaped element is formed of porous material.

6. A filter device as defined in claim 1, wherein said tubular-shaped element is coated with a solidifiable adhesive material.

7. A filter device as defined in claim 1, wherein said tubular-shaped element is porous and internally injected with a flowable solidifiable adhesive material, said adhesive material extending from the inside to the outside for securing said element to the filter material.

8. In a method of manufacturing a substantially zig-zag folded filter device for fluid mediums, comprising the steps of: forming at least one band-like member into a substantially tubular-shaped element prior to attachment thereof with a substantially flat filter material, applying a flowable adhesive material into the interior of said tubular-shaped porous element to permit the adhesive material to penetrate through the tubular-shaped element, bringing together said tubular-shaped element and at least one surface of the filter material to effect a bond through said adhesive material and folding said filter material and said tubular-shaped element to form folds perpendicular to said tubular shaped element, said folding including at least partially collapsing by inward movement the spaced walls of said element at the bends to allow formation of the desired tightness of folds without damaging the filter material at the bends.

9. The method as defined in claim 8, further including the step of folding the flat filter material together with the thus bonded tubular-shaped element into a substantially zig-zag configuration with sufficiently tight folds to bring the internal spaced walls of said tubular-shaped element into contact at said bends.

10. The method as defined in claim 8, wherein the band-like member is formed into said substantially tubular-shaped element directly prior to attachment thereof with said flat filter material.

11. The method as defined in claim 10, wherein the step of forming the band-like member into a substantially tubular-shaped element is undertaken by rolling together said band-like member about its lengthwise axis.

12. The method as defined in claim 11, wherein the step of rolling said band-like member brings the lengthwise edges thereof into abutting relationship.

13. The method as defined in claim 11, wherein the step of rolling together the band-like member brings the longitudinal edges thereof into overlapping relationship.

14. The method as defined in claim 8, further including the steps of forming a plurality of band-like members into substantially tubular-shaped elements which are then bonded by said adhesive material to at least one surface of the filter material in substantially parallel relationship with respect to one another.

15. In a method of manufacturing a substantially zig-zag folded filter device for fluid mediums, comprising the steps of forming at least one band-like member into a substantially tubular-shaped element prior to attachment thereof with a filter material defining a filter mat, applying flowable adhesive material to said substantially tubular-shaped element, bringing together said tubular-shaped element and at least one surface of the filter material to effect a bond through said adhesive material and folding said filter material and said tubular-shaped element to form folds perpendicular to said tubular-shaped element, said folding including at least partially collapsing by inward movement the spaced walls of said element at the bends to allow formation of the desired tightness of folds without damaging the filter material at the bends.

16. A filter device as defined in claim 7, wherein the marginal edges of the tubular-shaped element are bonded to one another by said solidifiable adhesive material.

17. The method as defined in claim 8, including the step of bonding the marginal edges of the tubular-shaped element to one another by means of the adhesive material applied into the interior of said tubular-shaped element.

* * * * *